United States Patent [19]

Login et al.

[11] 4,026,941
[45] May 31, 1977

[54] POLYOXYALKYLATED POLYOL POLYESTERS HAVING IMPROVED ANTISTATIC PROPERTIES

[75] Inventors: Robert Bernard Login, Woodhaven; Charles Francis Deck, Trenton; Basil Thir, Grosse Ile, all of Mich.

[73] Assignee: BASF Wyandotte Corporation, Wyandotte, Mich.

[22] Filed: Nov. 28, 1975

[21] Appl. No.: 635,933

[52] U.S. Cl. .................. 260/475 P; 260/75 N; 260/485 G; 260/468 K; 260/857 PE
[51] Int. Cl.² .................. C07C 69/34; C07C 69/80; C07C 69/82
[58] Field of Search ....... 260/485 G, 75 N, 857 PE, 260/475 P, 468 E, 468 K

[56] References Cited
UNITED STATES PATENTS

| | | | |
|---|---|---|---|
| 3,755,497 | 8/1973 | Weedon et al. | 260/75 T |
| 3,787,523 | 1/1974 | Crescentini et al. | 260/857 PE |
| 3,823,176 | 8/1974 | Levis et al. | 260/485 G |

Primary Examiner—Jane S. Myers
Attorney, Agent, or Firm—Joseph D. Michaels; Bernhard R. Swick; Robert E. Dunn

[57] ABSTRACT

Polyesters are prepared by the reaction of an alkyl ester of a dicarboxylic acid and certain polyoxyalkylated polyols having the formula:

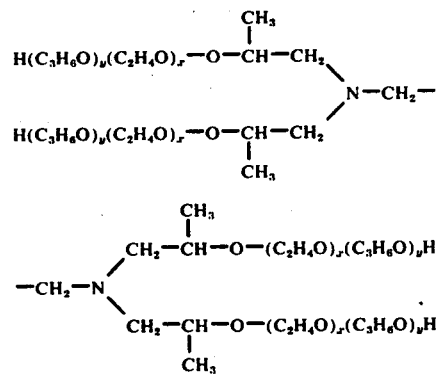

wherein $x$ and $y$ are integers such that the oxyethylene content of the polyol is between 10% and 90% by weight and the oxypropylene content of the polyol is between 90% and 10% by weight. The polyesters are particularly useful in the preparation of antistatic polymer compositions.

5 Claims, No Drawings

POLYOXYALKYLATED POLYOL POLYESTERS HAVING IMPROVED ANTISTATIC PROPERTIES

BACKGROUND OF THE INVENTION

1. Field Of The Invention

The present invention relates to polyoxyalkylated polyol polyesters having improved antistatic properties. More particularly, the invention relates to polyoxyalkylated polyol polyesters derived from certain polyoxyalkylated ethylene diamines.

2. Prior Art

In copending U.S. application Ser. No. 453,741 filed Mar. 22, 1974, which application is a division of U.S. application Ser. No. 177,136, filed Sept. 1, 1971, there is described the preparation of polyesters by the reaction of a hydrogen-reactive compound and an alkylene oxide adduct of a nitrogen-containing compound. These polyesters are disclosed as useful antistatic agents for melt-formed polymers.

The present invention is an improvement in the invention disclosed in the aforesaid applications in that it has now been found that a certain group of polyesters derived from certain polyoxyalkylated ethylene diamines possess improved dye-light fastness and antistatic properties.

SUMMARY OF THE INVENTION

Polyoxyalkylated polyol polyesters are prepared by the reaction of an alkyl ester of a dicarboxylic acid with a polyol having the formula:

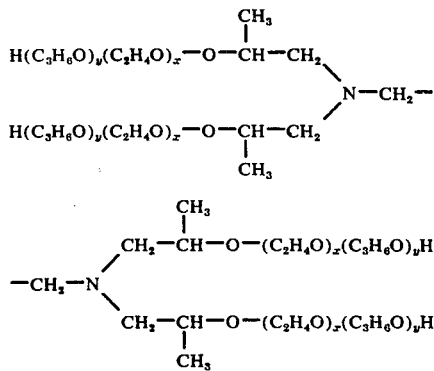

wherein $x$ and $y$ are integers such that the oxyethylene content of the polyol is between 10% and 90% by weight and the oxypropylene content of the polyol is between 90% and 10% by weight, employing an equivalent ratio of ester group to hydroxyl group of from about 0.25:1 to 0.5:1. The polyesters possess improved dye-light fastness and antistatic properties.

DESCRIPTION OF THE PREFERRED EMBODIMENTS

The present invention relates to new polyesters prepared by the reaction of an alkyl ester of a dicarboxylic acid with a polyol having the formula:

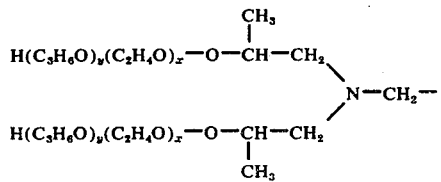

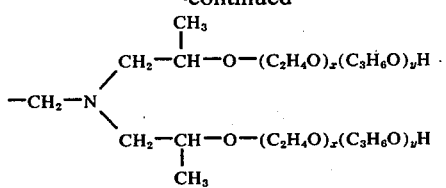

wherein $x$ and $y$ are integers such that the oxyethylene content of the polyol is between 10% and 90% by weight and the oxypropylene content of the polyol is between 90% and 10% by weight. These polyesters generally have a molecular weight ranging from about 25,000 to 500,000 and are thermally stable at temperatures of upwards of about 250° C. to 350° C. as measured by thermogravimetric analysis.

As mentioned above, the polyesters of the subject invention are prepared by the reaction of alkyl esters of dicarboxylic acids and polyoxyalkylated ethylene diamines. The polyoxyalkylated ethylene diamines useful in the subject invention are prepared by the reaction of propylene oxide with ethylene oxide adducts of N,N,N',N'-tetrakis-(2-hydroxypropyl) ethylene diamine.

The polyoxyalkylated ethylene diamines are prepared under conventional oxyalkylation conditions, e.g., 34 to 90 psi. and at 100° C. to 175° C. and in the presence of a conventional oxyalkylation catalyst. These resulting compounds, useful herein besides having the above physical properties, have a molecular weight ranging from about 1,000 to 40,000 and preferably from about 5,000 to 30,000.

The alkyl esters of dicarboxylic acids used in the present invention can be represented by the following formula:

R"OOC—R—COOR' wherein R is the organic portion of the dicarboxylic acid which may be either aliphatic or aromatic, R' and R" are, each, individually, alkyl having from one to four carbon atoms, or hydroxyalkyl having from two to four carbon atoms. Suitable aliphatic dicarboxylic acids are those having from two to ten carbon atoms in the aliphatic portion and which include, for example, oxalic acid, malonic acid, succinic acid, glutaric acid, adipic acid, pimelic acid, suberic acid, azelaic acid, and sebasic acid. Suitable aromatic dicarboxylic acids include phthalic acid, isophthalic acid, terephthalic acid, and hydrogenated terephthalic acid (1,4-cyclohexane dicarboxylic acid) and tetrachlorophthalic anhydride. Suitable R' and R" groups are methyl, ethyl, propyl, isopropyl, isobutyl, n-butyl, t-butyl, 2-hydroxyethyl and 2-hydroxypropyl.

Illustrative of the esters useful herein are dimethyl oxalate, diethyl oxalate, bis(2-hydroxyethyl) oxalate, dimethyl maleate, diethyl maleate, dibutyl maleate, bis(2-hydroxyethyl) succinate, diethyl succinate, dibutyl succinate, diethylphthalate and bis(2-hydroxyethyl) phthalate.

The preferred alkyl esters of dicarboxylic acids are those derived from terephthalic acid and which can be represented as:

wherein R' and R" have the same meaning ascribed above. Representative of these preferred esters are, for example, dimethyl terephthalate, diethyl terephthalate, bis(2-hydroxyethyl) terephthalate, and in particular dimethyl terephthalate.

In preparing the polyester, the alkyl ester of a dicarboxylic acid is reacted with the polyoxyalkylated ethylene diamine in an equivalent ratio of ester of hydroxyl groups of 0.25:1.0 to 0.5:1.0 and preferably from about 0.3:1.0 to 0.45:1.0. This reaction is usually conducted in an inert atmosphere, e.g., nitrogen, at a temperature ranging from about 60° C. to 160° C. and at either atmospheric pressure or a reduced pressure for a time period ranging from about one hour to four hours. Preferably, the reaction is carried out at a temperature ranging from about 70° C. to 150° C. and for a period ranging from about one hour to two hours.

In preparing these polyesters a catalyst may be employed. Suitable catalysts are either transesterification catalysts which include, for example, sodium hydroxide, potassium hydroxide, and the like or isocyanate reaction catalysts which are the conventional organometallic catalysts, such as dibutyltin dilaurate and stannous octoate. The catalyst will nominally be employed in catalytic amounts ranging from about 0.01 part of 0.2 part per 100 parts by weight of reactants. Where a transesterification catalyst is employed, it is incumbent to neutralize any residual amounts thereof by known conventional procedures after cessation of the reaction.

The resulting products will range from either a viscous liquid to a hard wax. The hard wax upon subjecting to heat or elevated temperatures, will transform to a highly viscous liquid which for illustrative purposes will have a viscosity at 100° C. ranging from about 200 cps. to about 40,000 cps., the same viscosity range being applicable to the viscous liquid products.

The following Examples illustrate the invention. All parts are by weight unless otherwise indicated.

EXAMPLE I

A. Preparation of Polyoxyalkylated Ethylene Diamine

A reactor equipped with a stirrer, thermometer an heating means was charged with 400 parts of N,N,N',N'-tetrakis(2-hydroxypropyl) ethylene diamine and 28 parts of potassium hydroxide (90% flake). The charge was purged with nitrogen, evacuated to less than 10 mm. of mercury and stripped at 125° C. for one hour. The vacuum was relieved with nitrogen and the charge was pressurized to 34 psi. The charge was then heated to 135° C. and 2100 parts of ethylene oxide was added over a period of four hours. Upon completion of the oxide addition, the reaction mixture was heated at 135° C. for one hour. The mixture was cooled to 60° C. and discharged from the reactor. The product, hereinafter referred to as "Precursor I", had a hydroxyl number of 130.

A reactor equipped as described above was charged with 595 parts of the product prepared above. After purging with nitrogen and stripping for less than an hour at 135° C. under less than 10 mm. of mercury, the reactor was pressurized to 34 psi. with nitrogen. The charge was then heated to 135° C. and 1466 parts of ethylene oxide was added over a two-hour period. Upon completion of the oxide addition, the reaction mixture was heated for an additional hour. The temperature of the mixture was reduced to 115° C. and 738 parts of propylene oxide was added to the reactor over a period of two hours. Upon completion of the propylene oxide addition, the reaction mixture was heated for an additional hour at 115° C., cooled to 60° C. and discharged from the reactor. The resulting product had a hydroxyl number of 29.6 a hydroxyl molecular weight of 7600, an ethylene oxide content of 70% by weight of the polyol and a propylene oxide content of 30% by weight of the polyol.

B. Preparation of Polyoxyalkylated Polyol Polyester

A reactor equipped as described above was charged with 1097 parts of the polyol described in A, above. The charge was heated to 100° C. and vacuum stripped at less than 5 mm. of mercury for 30 minutes. The vacuum was relieved with nitrogen and 26.7 parts of dimethyl terephthalate was added to the charge. The reaction temperature was raised to 160° C. and the reaction continued for about one hour. The product was then vacuum stripped at 160° C. for 30 minutes. The resulting product had a hydroxyl number of 16 corresponding to a molecular weight of 47,000 and a viscosity at 100° C. of 18,000 cps.

EXAMPLES II-VI

Following the procedure described in Example I, a series of polyoxyalkylated ethylene diamines was prepared employing various amounts of Precursor I (as described supra), ethylene oxide and propylene oxide. Details of the preparations as well as physical characterizations of the resulting polyols are presented in Table I, below. The polyols were thereafter reacted with dimethylterephthalate to provide polyoxyalkylated polyol polyesters. Details of the preparations as well as physical characteristics of the resulting polyesters are presented in Table II, below.

TABLE I

| Example | Precursor I, Parts | E.O., Parts | P.O., Parts | Temperature,° C. | Time, Hours | Product Characterization | | | |
|---|---|---|---|---|---|---|---|---|---|
| | | | | | | % E.O. | % P.O. | Hydroxyl Number | Molecular Weight |
| II | 100 | 248 | 284 | 115–135 | 10 | 55 | 45 | 25 | 8,900 |
| III | 100 | 248 | 523 | 115–135 | 10 | 40 | 60 | 22 | 10,200 |
| IV | 100 | 248 | 126 | 115–135 | 10 | 70 | 30 | 29 | 7,600 |
| V | 100 | 204 | 370 | 115–135 | 10 | 40 | 60 | 27 | 8,200 |
| VI | 100 | 1058 | 203 | 115–135 | 12 | 85 | 15 | 14 | 16,000 |

E.O. = Ethylene Oxide
P.O. = Propylene Oxide

TABLE II

| Product From Example | Parts | DMT, Parts | Equivalent Ratio DMT/Product | Polyol Polyester Hydroxyl Number | Viscosity, 100° C. |
|---|---|---|---|---|---|
| II | 500 | 9.0 | 0.41 | 14.5 | 14,000 |
| III | 500 | 7.6 | 0.41 | 13.2 | 4,000 |
| IV | 500 | 10.2 | 0.40 | 17.4 | 9,000 |
| V | 500 | 8.7 | 0.36 | 14.4 | 5,200 |
| VI | 500 | 3.6 | 0.30 | 7.7 | >100,000 |

DMT = Dimethyl Terephthalate

EXAMPLE VII

A. Preparation of Polyoxyalkylated Ethylene Diamine

A reactor equipped as described in Example I was charged with 100 parts of Precursor I. After purging with nitrogen and stripping for less than an hour at 100° C. under less than 10 mm. of mercury, the reactor was pressurized to 34 psi. with nitrogen. The charge was then heated to 130° C. and 248 parts of ethylene oxide was added over a two-hour period. Upon completion of the oxide addition, the reaction mixture was heated for an additional hour. The temperature of the mixture was reduced to 115° C. and 284 parts of propylene oxide was added to the reactor over a period of two hours. Upon completion of the propylene oxide addition, the reaction mixture was heated for an additional hour at 115° C., cooled to 60° C. and discharged from the reactor. The resulting product had a hydroxyl number of 25, a hydroxyl molecular weight of 8900, an ethylene oxide content of 55% by weight of the polyol, and a propylene oxide content of 45% by weight of the polyol.

B. Preparation of Polyoxyalkylated Polyol Polyester

A reactor equipped as described above was charged with 715 parts of the polyol described in A, above. The charge was heated to 100° C. and vacuum stripped at less than 5 mm. of mercury for 30 minutes. The vacuum was relieved with nitrogen and 27.9 parts of dimethyl azelate was added to the charge. The reaction temperature was raised to 130° C. and the reaction continued for about one hour. The product was then vacuum stripped at 130° C. for 30 minutes. The resulting product had a hydroxyl number of 10.0 and a viscosity at 100° C. of 18,000 cps.

EXAMPLE VIII

The surface resistivity of the polyoxyalkylated polyol polyesters prepared in Examples I–V and VII was evaluated employing a Keithly apparatus at 10%, 20% and 30% relative humidity. The apparatus consists of an electrometer (Model 610C), a power supply (Model 240A) and a resistivity adapter (Model 610S). In addition, an automatic relative humidity control system was employed. The resistivity values of the polyesters are obtained by measuring resistance and converting it to resistivity. This is accomplished with an electrode configuration into which a sample is inserted. The resistance measurement is facilitated by applying a potential to the sample and determining the resultant current. The surface resistivity is calculated from the following equation:

$$\rho s = 53.36 \times V/I \text{ ohms}$$

where $\rho s$ = surface resistivity $V$ = voltage setting (volts)

$I$ = current reading (amps)

In the evaluations, samples were prepared by melting small quantities (approximately 0.5 gram) of the polyester on three glass plates, spreading the samples uniformly on the plate and conditioning from 48 hours to 72 hours at 10% relative humidity. The samples were then evaluated in triplicate, conditioned for 24 hours at 20% RH and evaluated and conditioned for 24 hours at 30% and evaluated. Average results of these measurements are presented in Table III, below.

TABLE III

| Product Of Example | Surface Resistivity, ohms | | |
|---|---|---|---|
| | 10% RH | 20% RH | 30% RH |
| I | $3.5 \times 10^{10}$ | $1.6 \times 10^{10}$ | $8.0 \times 10^{9}$ |
| II | $5.0 \times 10^{10}$ | $4.5 \times 10^{10}$ | $8.0 \times 10^{9}$ |
| III | $4.2 \times 10^{10}$ | $1.0 \times 10^{10}$ | $1.0 \times 10^{10}$ |
| IV | $8.9 \times 10^{10}$ | $1.2 \times 10^{10}$ | $1.4 \times 10^{10}$ |
| V | $5.0 \times 10^{10}$ | $4.0 \times 10^{10}$ | $2.7 \times 10^{9}$ |
| VII | $5.0 \times 10^{10}$ | $3.1 \times 10^{10}$ | $1.3 \times 10^{10}$ |

RH = Relative Humidity

The values presented in the above Table indicate that the products possess utility as antistat additives particularly as internal antistat additives for polyamide polymers.

The embodiments of the invention in which an exclusive property or privilege is claimed are defined as follows:

1. Polyoxyalkylated polyol polyesters prepared by the reaction at a temperature between 60° C. and 160° C. of an alkyl ester of a dicarboxylic acid represented by the formula:

$$R''OOC-R-COOR'$$

wherein R' and R'' are individually alkyl having from one to four carbon atoms or hydroxyalkyl having from two to four carbon atoms and R is the organic portion of a dicarboxylic acid selected from the group consisting of oxalic, malonic, succinic, glutaric, adipic, pimelic, suberic, azelaic, sebasic, phthalic, isophthalic, terephthalic and hydrogenated terephthalic with a polyol having the formula:

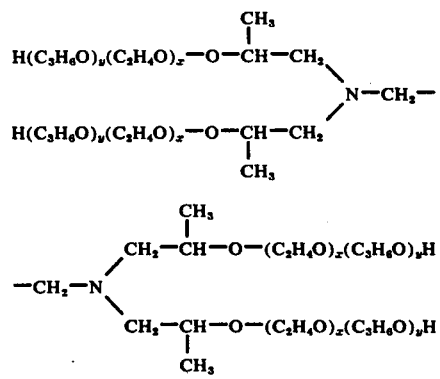

wherein $x$ and $y$ are integers such that the oxyethylene content of the polyol is between 10% and 90% by weight and the oxypropylene content of the polyol is between 90% and 10% by weight, employing an equivalent ratio of ester group to hydroxyl group of from about 0.25:1 to 0.5:1.

2. The polyester of claim 1 wherein the alkyl ester of a dicarboxylic acid is dimethyl terephthalate.

3. The polyester of claim 1 wherein the alkyl ester of a dicarboxylic acid is dimethyl azelate.

4. The polyester of claim 1 wherein the polyol has an oxypropylene content between 30% and 70% by weight.

5. The polyester of claim 1 wherein the alkyl ester is dimethyl terephthalate and the polyol has an oxyethylene content of approximately 40 weight percent and an oxypropylene content of approximately 60 weight percent.

* * * * *